United States Patent
Ohtomo et al.

(10) Patent No.: US 7,042,677 B2
(45) Date of Patent: May 9, 2006

(54) RECORDING/PRODUCING SEPARATED TYPE MAGNETIC HEAD

(75) Inventors: Shigekazu Ohtomo, Fujisawa (JP); Hiroshi Fukui, Fujisawa (JP); Nobuo Yoshida, Fujisawa (JP)

(73) Assignee: Hitachi Global Storage Technologies Japan, Ltd., Odawara (JP)

( * ) Notice: Subject to any disclaimer, the term of this patent is extended or adjusted under 35 U.S.C. 154(b) by 190 days.

(21) Appl. No.: 10/666,876

(22) Filed: Sep. 18, 2003

(65) Prior Publication Data

US 2004/0105189 A1 Jun. 3, 2004

(30) Foreign Application Priority Data

Nov. 26, 2002 (JP) .............................. 2002-342184

(51) Int. Cl.
*G11B 5/147* (2006.01)
(52) U.S. Cl. ...................................... 360/126
(58) Field of Classification Search ............... None
See application file for complete search history.

(56) References Cited

U.S. PATENT DOCUMENTS

| | | | | |
|---|---|---|---|---|
| 5,452,164 A | * | 9/1995 | Cole et al. ................ | 360/317 |
| 6,195,232 B1 | * | 2/2001 | Cohen ....................... | 360/126 |
| 6,788,497 B1 | * | 9/2004 | Cates ........................ | 360/126 |
| 6,791,795 B1 | * | 9/2004 | Ohtomo et al. ............ | 360/126 |
| 2003/0099054 A1 | * | 5/2003 | Kamijima .................. | 360/59 |
| 2004/0037012 A1 | * | 2/2004 | Nakanishi ................... | 360/317 |

FOREIGN PATENT DOCUMENTS

| JP | 2000276707 A | 10/2000 |
|---|---|---|
| JP | 2002157705 A | 5/2002 |

* cited by examiner

*Primary Examiner*—Allen Cao
(74) *Attorney, Agent, or Firm*—Townsend and Townsend and Crew LLP

(57) ABSTRACT

A protrusion 24 having a width Lpfw equal to or somewhat larger than a track width Tw and protruding to the air bearing surface is provided on a lower magnetic pole 5 or lower magnetic pole front end layer 19. The lower magnetic pole 5 or the lower magnetic pole front end layer 19 other than the protrusion is retracted by Lpfd from the air bearing surface 15. With the constitution, since the upper end surface 23 of the lower magnetic pole 5 or the lower magnetic pole to end layer 19 that generates the leakage magnetic fields in the off-track portions is not exposed to the air bearing surface 15, the leakage magnetic fields Hxz in the off-track portions can be decreased greatly.

6 Claims, 19 Drawing Sheets

FIG.10
(a)
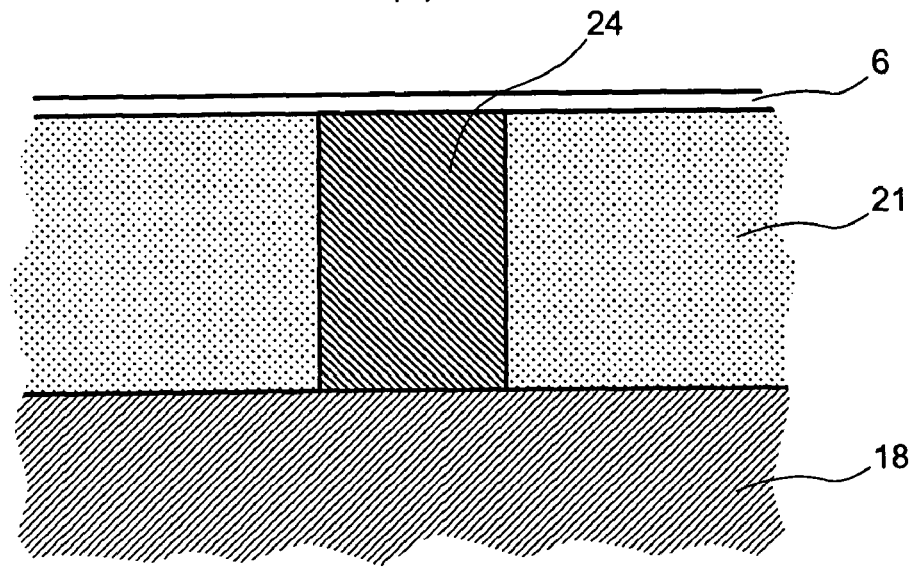
(b)
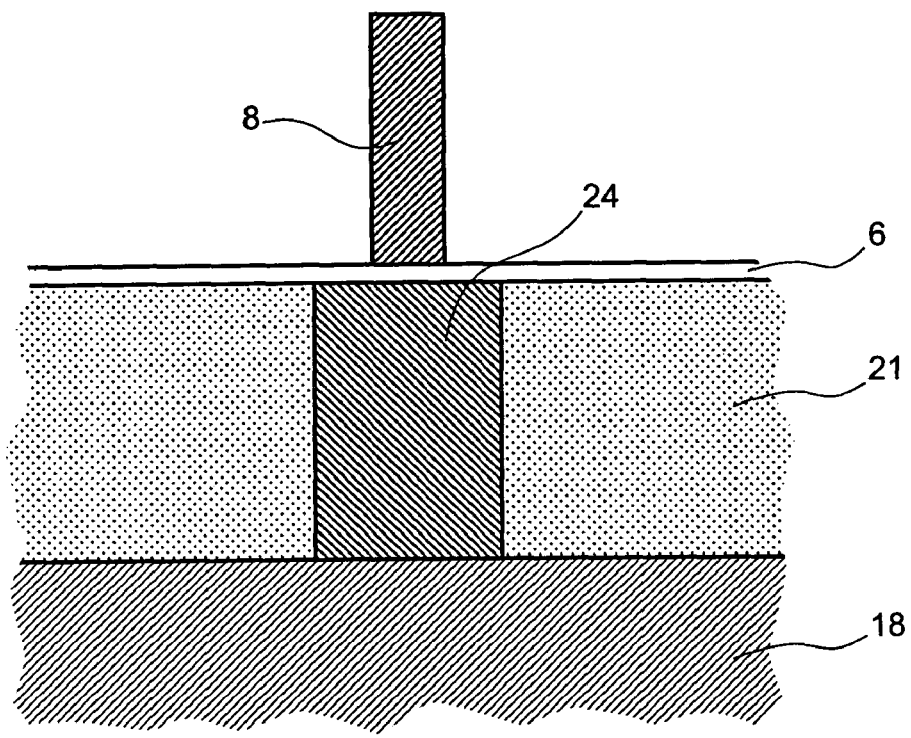

FIG.11
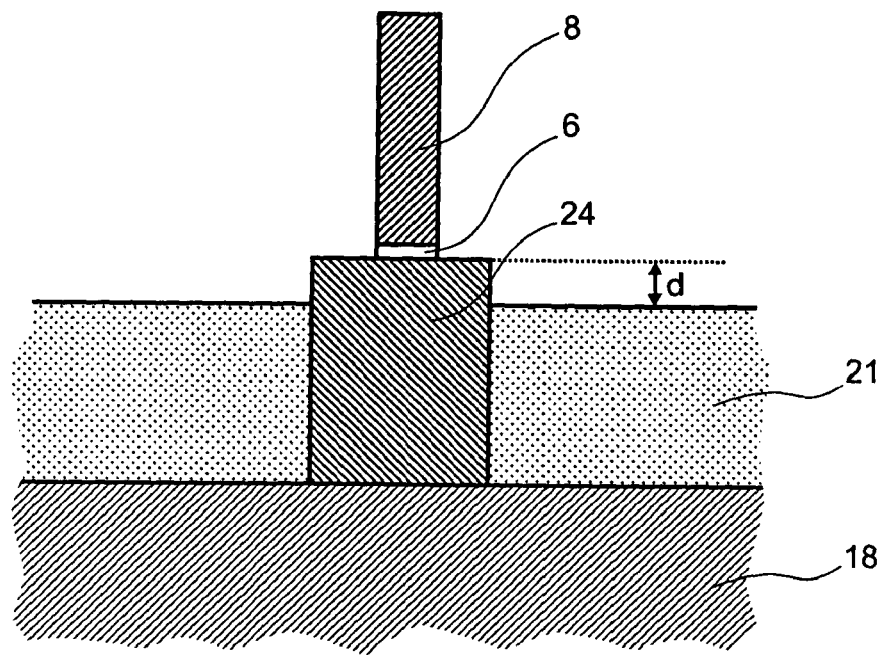
(c)
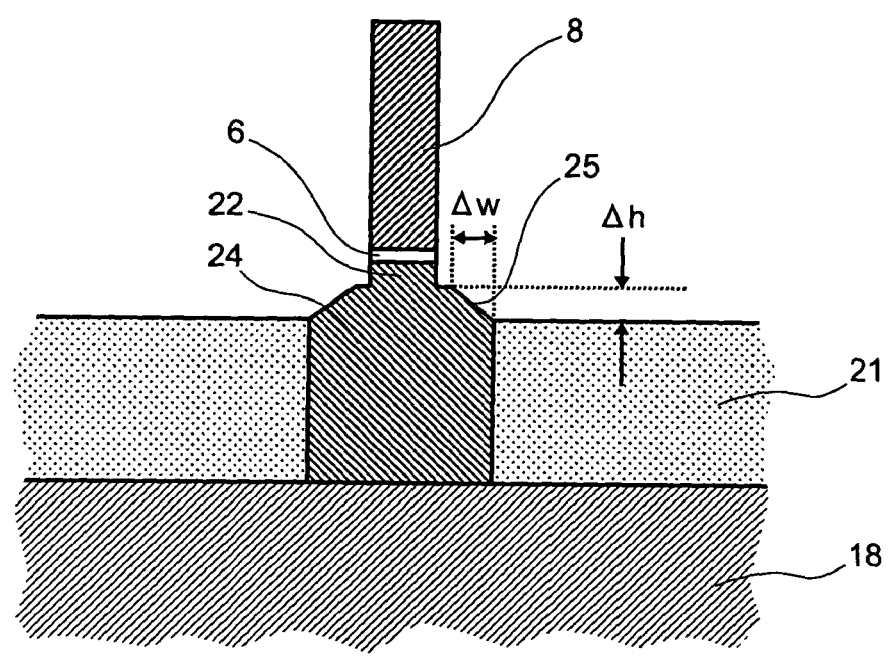
(d)

FIG. 18
(a)
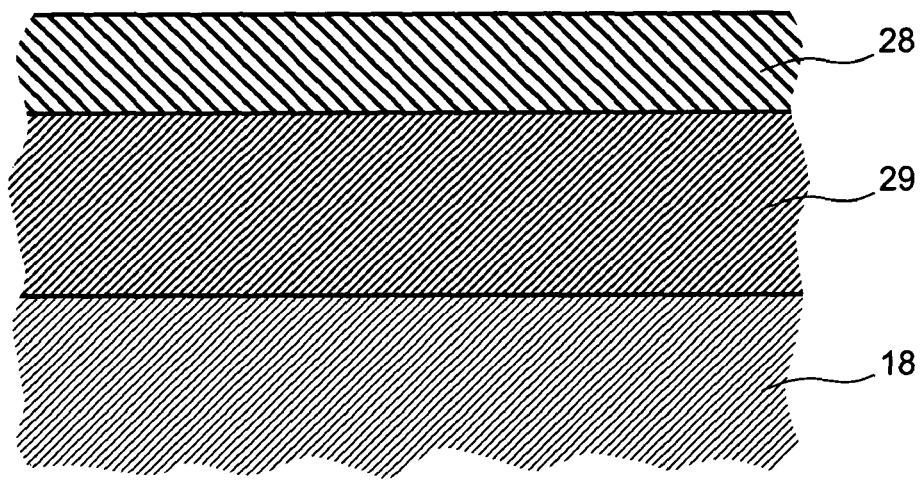
(b)
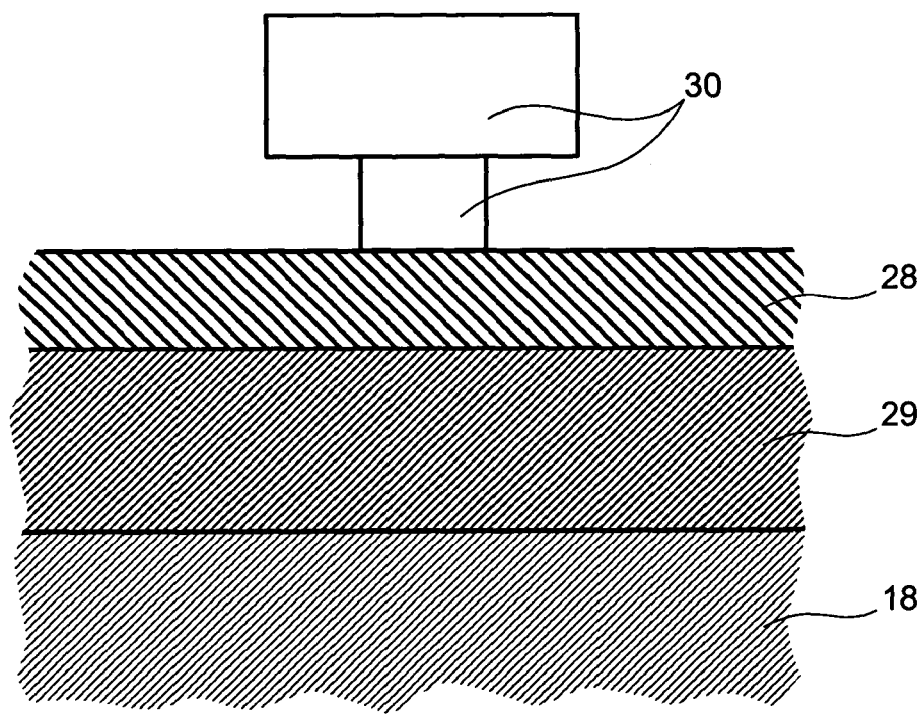

FIG.19
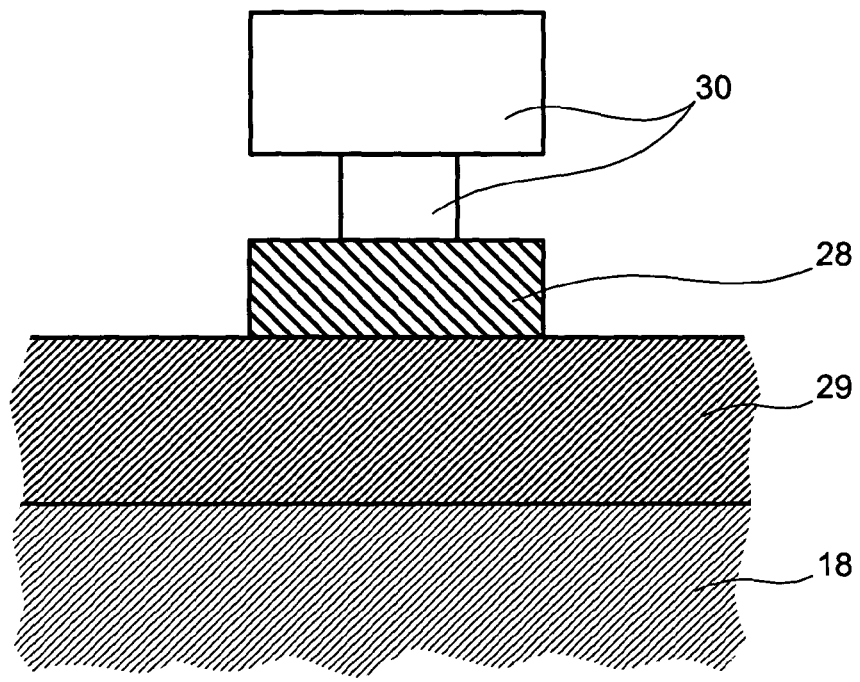
(c)
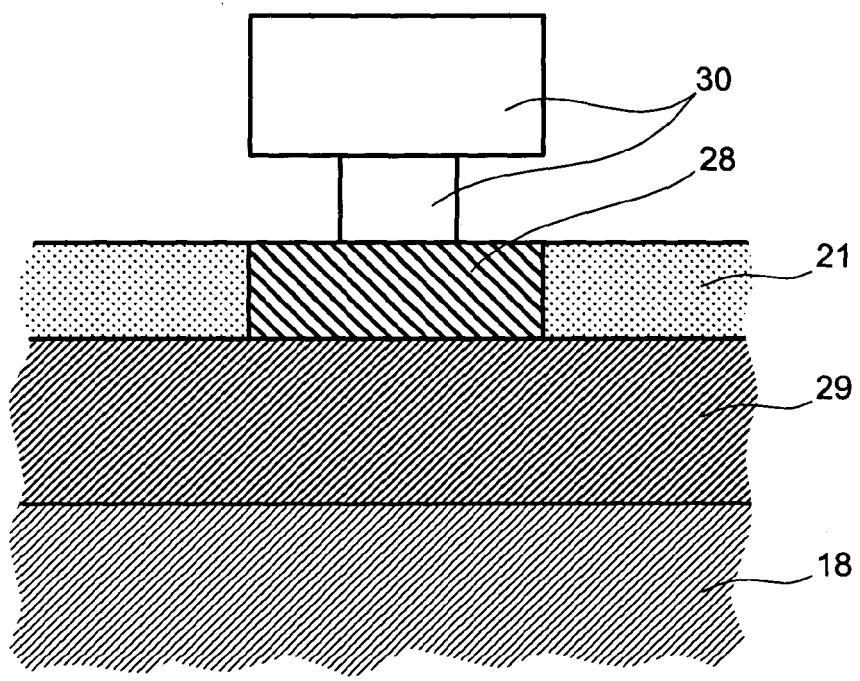
(d)

RECORDING/PRODUCING SEPARATED TYPE MAGNETIC HEAD

CROSS-REFERENCES TO RELATED APPLICATIONS

This application claims priority to Japanese application No. 2002-342184, filed Nov. 26, 2002, the disclosure of which is incorporated by reference.

BACKGROUND OF THE INVENTION

1. Field of the Invention

The present invention relates to a recording/reproducing separated type magnetic head for use in magnetic recording disk drives and, in particular, it relates to a thin film recording head having a narrow track width used at high density recording and high track pitch.

2. Description of Related Art

In recent years, along with the improvement in the recording density in magnetic recording disk drives, there has been a strong demand for the improvement in the performance of recording media, as well as the development of thin film magnetic head excellent in recording/reproducing characteristics. At present, heads using MR (Magnetic Resistive Effect) elements or GMR(Giant Magnetic Resistive Effect) elements capable of obtaining high read output are used as the recording head. Further, TMR (Tunnel Magnetic Resistance) elements capable of obtaining further higher reproducing sensitivity have also been developed. On the other hand, existent induction type thin film recording heads utilizing electromagnetic induction are used for the recording head, and recording/reproducing separated type thin film magnetic heads in which the recording head and the wiring head are formed integrally as described above are used.

To improve the recording characteristics of the thin film recording head, it is necessary to generate strong and sharp recording magnetic fields for effective recording to recording media at high coercivity. However, magnetic saturation is caused in the magnetic pole front end of the thin film recording head due to decrease of the track width along with the improvement in the track density, resulting in a problem of lowering the recording magnetic fields. Further, there is a problem that the recording magnetic fields should leak beyond the track width to adjacent track portions.

An existent thin film magnetic head has a structure as described in FIG. 2 of the Patent Document 1, in which an upper magnetic pole is separated into an upper magnetic pole front end layer and an upper magnetic pole upper layer. In this structure, as shown in FIG. 3, a lower magnetic shield 2 made of a soft magnetic material for improving resolution upon reproducing and eliminating the effects of external magnetic fields is disposed on a substrate 1 made of a non-magnetic material, a reproducing gap 3 made of a non-magnetic insulative material is disposed on the lower magnetic shield 2, and a reproducing element 4 comprising an MR or GMR element is disposed in the reproducing gap 3. A lower magnetic pole 5 made of a soft magnetic material used also as an upper magnetic shield is disposed on the reproducing gap 3 and, further, a recording gap layer 6 is disposed. A depth defining non-magnetic layer 7 for defining the gap depth is disposed on the gap layer 6 and, further, an upper magnetic pole front end layer 8 and an upper magnetic layer rear end layer 9 are disposed and a gap therebetween is filled and planarized with a non-magnetic insulating layer 10. A coil insulating layer 11 is disposed on the surface planarized, and lower conductor coils 12 and upper conductor coils 12' are disposed in the coil insulating layer 11. The conductor coils may sometimes consist of only one layer. Further, an upper magnetic pole upper layer 13 is disposed and the entire head is protected by a protection layer 14.

The width for the upper magnetic pole front end layer 8 on the air bearing surface 15 is formed in a width corresponding to a track width. The conductor coils 12, 12' are constituted so as to surround the rear end 16 of the upper magnetic pole upper layer. Application of a recording current to the conductor coils 12, 12' induces magnetic fluxes in the upper magnetic pole upper layer 13, the upper magnetic pole rear end layer 9 and the lower magnetic pole 5 and records signals in a recording medium 17 that runs spaced apart by a minute distance from the air bearing surface 15 by recording magnetic fields generated from the front end of the recording gap. Magnetic fluxes are concentrated from the lower magnetic pole 5 in the vicinity of the recording gap to generate high recording magnetic fields. The length in which the upper magnetic front end layer 8 is in contact with the recording gap layer 6 is referred to as a gap depth Gd, and the recording magnetic fields increase as the gap depth decreases since the magnetic fluxes are concentrated to the magnetic pole gap end.

Further, as a method of improving the accuracy upon forming the narrow track, a recording/reproducing separated type thin film magnetic head shown in FIG. 4 is proposed in Patent Document 2. For the head proposed, a lower magnetic pole front end layer 19 and a lower magnetic pole rear end layer 20 are disposed on a lower magnetic pole main layer 18 and a gap therebetween is filled and planarized with a lower non-magnetic insulating layer 21, to form a recording gap layer 6, and then a resist frame is prepared on the planar surface to form an upper magnetic pole front end layer 8. Thus, a narrow track width can be formed with high accuracy.

FIG. 5 shows a perspective view for the head front end of the recording/reproducing separated type thin film magnetic field shown in FIG. 4. In both of the thin film magnetic head shown in FIG. 3 and FIG. 4, a trimmed portion 22 having a width substantially equal to a track width Tw is formed at the front end of the lower magnetic pole 5 and the lower magnetic pole front end layer 18, thereby decreasing so-called fringe magnetic fields that leak to the outside of the track width Tw.

Patent Document 1

Japanese Published Application 2000-276707 (pages 7–8, FIG. 2)

Patent Document 2

Japanese Published Application 2002-157705 (page 3, FIGS. 1–2)

In the prior art described above, the lower magnetic pole 5 or the lower magnetic pole front end layer 19 is subjected to ion milling or reactive ion etching using the track forming portion of the magnetic pole front end layer 8 as a mask to form the trimmed portion 22. Accordingly, the height Tr for the trimmed portion 22 is limited to about 2 to 3 times the recording gap and it is extremely difficult to increase the height of the trimmed portion 22 in view of manufacture. Therefore, it is difficult to effectively decrease the magnetic fields that leak to the outside of the track width to possibly record surplus signals on adjacent tracks or gradually erase recorded signals in the adjacent tracks due to a great number of times of recording operations along with decrease in the track pitch.

SUMMARY OF THE INVENTION

An object of the present invention is to provide a recording/reproducing separated type magnetic head capable of greatly decreasing off-track leakage magnetic fields in a thin film recording head, thereby attaining a narrow track pitch.

To attain the foregoing object, in a recording/reproducing separated type magnetic head according to the present invention, a protrusion having a width equal to or slightly larger than the track width and protruding on the side of a air bearing surface is disposed to a lower magnetic pole or a lower magnetic pole front end layer, and the lower magnetic pole or the lower magnetic pole front end layer other than the protrusion is retracted from the air bearing surface. With such a constitution, since the upper end surface of the lower magnetic pole or the lower magnetic pole front end layer where leakage magnetic fields for the off-track portion will be generated is not exposed to the air bearing surface, leakage magnetic fields for the off-track portion can be decreased greatly.

In a case of forming a track width portion of the upper magnetic pole front end layer at the protrusion formed on the lower magnetic pole or the lower magnetic pole front end layer, it is difficult to perform positional alignment between the protrusion and the track width portion of the upper magnetic pole front end layer. It is preferred that the width for the protrusion and the track width for the upper magnetic pole front end layer are identical to obtain a recording magnetic field distribution with less off-track leakage magnetic fields. However, the positional alignment is difficult, resulting in displacement of the track width between the upper magnetic field and the lower magnetic field to possibly decrease the effective track width and the recording magnetic fields. In the thin film recording head of the recording/reproducing separated type magnetic head according to the invention, the width for the protrusion disposed on the lower magnetic pole or the lower magnetic pole front end layer is set larger than the track width for the upper magnetic pole front end layer, the track portion of the upper magnetic pole front end layer is formed thereon and then a portion larger than the track width for the protrusion is removed by ion milling or reactive ion etching using the track width portion of the upper magnetic front end layer as a mask to form a trimmed portion, thereby preventing displacement of the track width between the lower magnetic pole and the upper magnetic pole. In this case, by defining the initial width for the protrusion to an appropriate value relative to the track width, positional alignment of the track is possible and the off-track leakage magnetic fields can also be decreased.

Further, in the thin film recording head of the recording/reproducing separated type magnetic head according to the invention, upper end corners other than the portion constituting the track width for the protrusion are removed. This permits the off-track leakage magnetic fields to be decreased even when the width for the protrusion is increased.

BRIEF DESCRIPTION OF THE DRAWINGS

FIG. 10 (with segments (a) and (b)) is a view showing a method of manufacturing the thin film recording head of the recording/reproducing separated type magnetic head according to the third embodiment of the present invention.

FIG. 11 (with segments (c) and (d)) is a view showing a method of manufacturing the thin film recording head succeeding to FIG. 10.

FIG. 18 (with segments (a) and (b)) is a view showing a method of manufacturing film recording head of the recording/reproducing separated type magnetic head g to the sixth embodiment of the present invention.

FIG. 19 (with segments (c) and (d)) is a view showing a method of manufacturing film recording head succeeding to FIG. 18.

Figure 1:
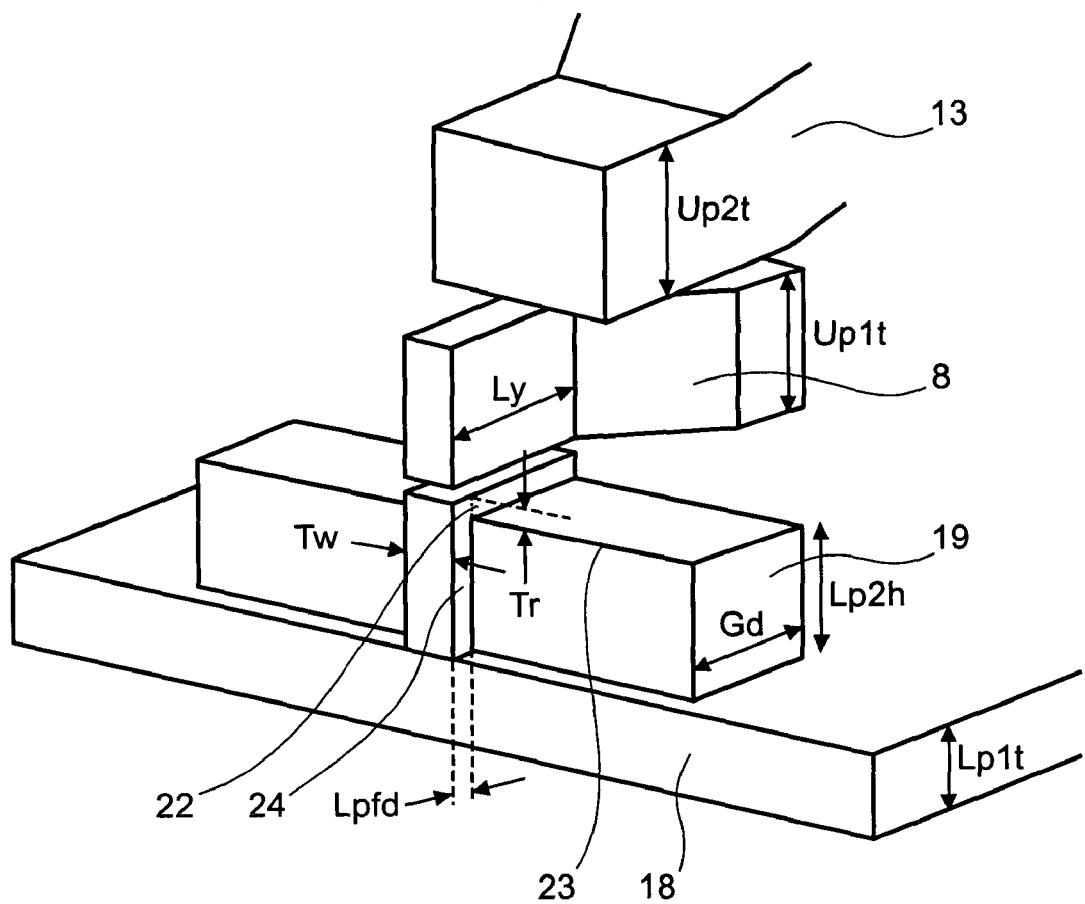
FIG. 1 is a perspective view of a thin film recording head of a recording/reproducing separated type magnetic head according to a first embodiment of the present invention, as viewed in the direction of an air bearing surface.

The following table includes a description of reference numerals.

| | |
|---|---|
| 1 | substrate |
| 2 | lower magnetic shield |
| 3 | reproducing gap |
| 4 | reproducing element |
| 5 | lower magnetic pole |
| 6 | recording gap layer |
| 7 | depth defining non-magnetic layer |
| 8 | upper magnetic pole front end layer |
| 9 | upper magnetic pole rear end layer |
| 10 | non-magnetic insulating layer |
| 11 | conductor coil insulating layer |
| 12 | lower layer conductor coil |
| 12' | upper layer conductor coil |
| 13 | upper magnetic pole upper layer |
| 14 | protection layer |
| 15 | air bearing surface |
| 16 | rear end of upper magnetic pole upper layer |
| 17 | recording medium |
| 18 | lower magnetic pole main layer |
| 19 | lower magnetic pole front end layer |
| 20 | lower magnetic pole rear end layer |
| 21 | lower non-magnetic insulating layer |
| 22 | trimmed portion |
| 23 | front end surface of lower magnetic pole front end layer |
| 24 | protrusion |
| 25 | front end corners for protrusion |
| 26 | upper magnetic shield |
| 27 | separation layer |
| 28 | upper layer of lower magnetic pole front end layer |
| 29 | lower layer of lower magnetic pole front end layer |
| 30 | resist pattern |
| Tw | track width |
| Gd | gap depth |
| GL | gap length |
| Tr | trim height |
| Lpfw | width for protrusion |
| Lpfd | retraction amount of lower magnetic pole or lower magnetic pole front end layer |
| Lp2h | height for lower magnetic front end layer |
| Ly | magnetic pole extending position for the upper layer magnetic pole front end layer |
| Up1t | thickness for upper magnetic pole front end layer |
| Up2t | thickness for upper magnetic pole upper layer |
| Lp1t | thickness for lower magnetic pole main layer |

DESCRIPTION OF ILLUSTRATIVE EMBODIMENTS

The present invention is to be described more specifically by way of embodiments.

First and Second Embodiment

Figure 2:
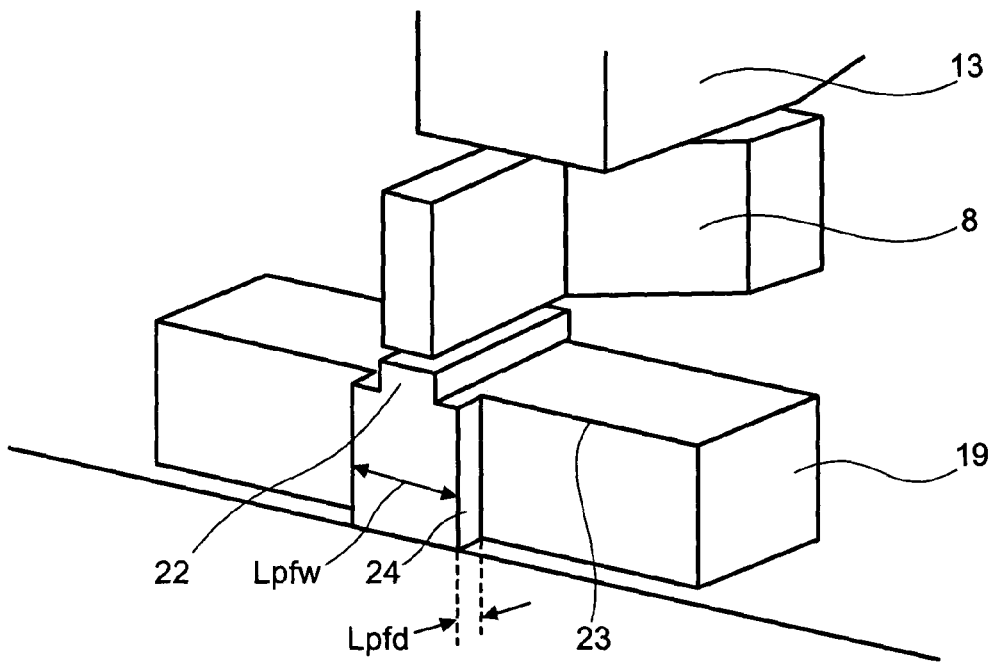
FIG. 2 is a perspective view of a thin film recording head of a recording/reproducing separated type magnetic head according to a second embodiment of the present invention, as viewed in the direction of an air bearing surface.

FIG. 1 shows a perspective view of a portion near the front end of a thin film recording head of a recording/reproducing separated type magnetic head according to a first embodiment the invention. The structure for the head cross section is identical with that in FIG. 4. In the drawing, a lower magnetic pole main layer 18, a lower magnetic pole front end layer 19, an upper magnetic pole front end layer 8, and an upper magnetic pole upper layer 13 are shown while a magnetic shield, conductor coils, insulating layers and a protection film are not illustrated. A protrusion 24 having a width substantially equal to a track width Tw is disposed on a portion of the lower magnetic pole front end layer 19. In this case, the lower magnetic pole front end layer 19 other than the protrusion 24 is disposed at a position spaced apart by a depth Lpfd from the air bearing surface. Further, FIG. 2 shows a thin film recording head according to a second embodiment of the invention. A protrusion 24 having a width Lpfw larger than the track width Tw is disposed on a portion of the lower magnetic pole top layer 19, and the lower magnetic pole front end layer 19 other than the protrusion 24 is retracted by a distance Lpfd from the air bearing surface.

Off-track leakage magnetic fields formed by the constitution described above were determined by using computer simulation. In the head structure shown in FIG. 1 and FIG. 2, it is defined as track width Tw=0.25 μm, recording gap length GL=0.1 μm, gap depth Gd=1 μm, trim height Tr=0.22 μm, lower magnetic pole height Lp2h=1.5 μm, upper magnetic pole restriction position Ly=1 μm, lower magnetic pole main layer thickness Lp1t=2 μm, upper magnetic pole front end layer thickness Up1t=1.5 μm, and upper magnetic pole upper layer thickness Up2t=2 μm. As the magnetic material for the thin film recording head, 45Ni—Fe (saturation magnetic flux density Bs≈1.68T) was used for the lower magnetic pole main layer 18 and the upper magnetic pole upper layer 13, and CoNiFe film (Bs=2.2T) was used for the lower magnetic pole front end layer 19 and the upper magnetic layer front end layer 8. Magnetomotive force was 0.54 AT. Further, an existent thin film recording head, as a comparative example, shown in FIG. 5 was manufactured by using the same size and identical magnetic material other than those for the protrusion 24.

Figure 5:
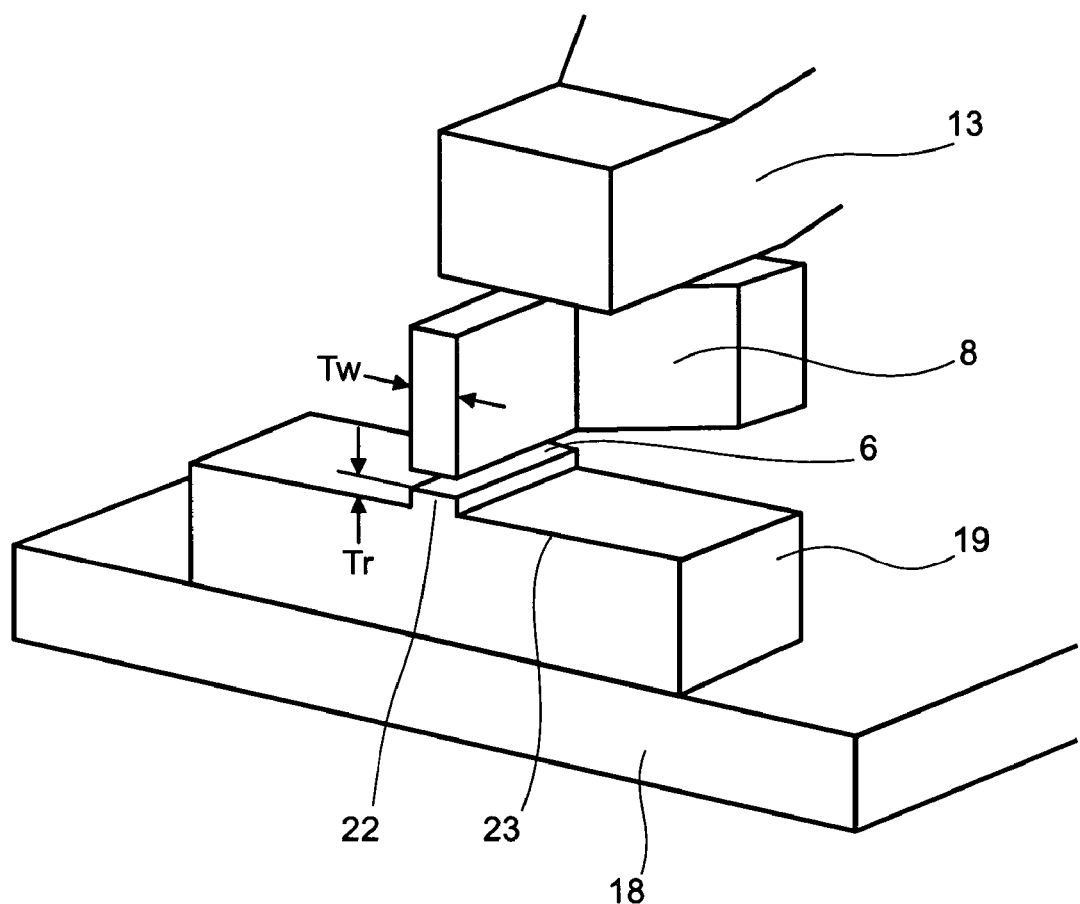
FIG. 5 is a perspective view of a thin film recording head of a conventional recording/reproducing separated type magnetic head shown in FIG. 4, as viewed in the direction of an air bearing surface.
Figure 6:
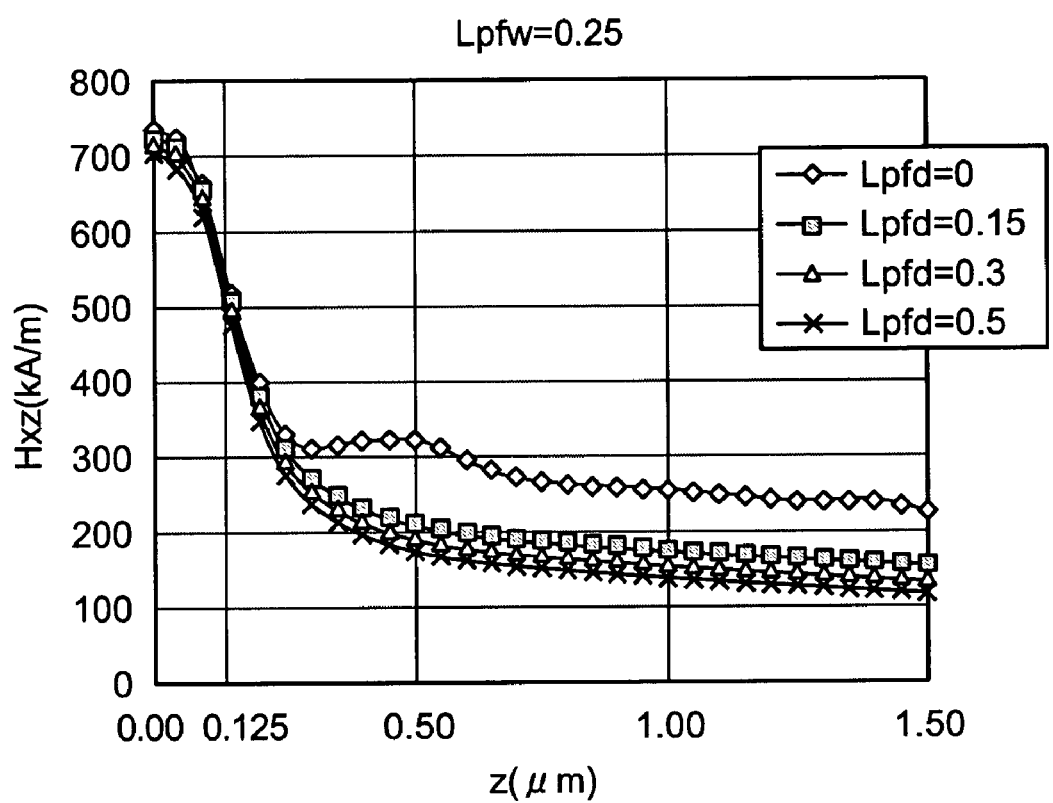
FIG. 6 is a view comparing off-track leakage magnetic fields between a thin film recording head according to the first embodiment of the present invention and the conventional thin film recording head.

FIG. 6 shows the distribution of leakage magnetic fields Hxz in the off-track direction when the width Lpfw for the protrusion 24 is 0.25 μm which is identical with the track width Tw. Z represents the direction for the track width, Z=0 represents the center for the track width, and Hxz is a vectorial sum for the magnetic field component Hx in the head running direction and the magnetic field component Hz in the track width direction, showing a maximum value at each Z position when the head running direction X is changed. As shown in the drawing, at Lpfd=0, that is, with no provision of the protrusion 24 (prior art, shown in FIG. 5), the magnetic field at the off-track position Z=0.5 μm is as high as about 320 kA/m (4000 Oe) and the magnetic fields are not decayed so much even when Z increases further. On the other hand, when the protrusion 24 is formed as in the thin film recording head of the first embodiment, magnetic fields in off-track decrease greatly in any case from 0.15 μm to 0.5 μm of Lpfd, and the magnetic fields at Z=0.5 μm is 220 kA/m (2750 Oe) or less.

As described above, in the head shown in FIG. 5 with no protrusion 24, since leakage magnetic fluxes flow from the upper magnetic pole front end layer 8 to the upper end surface 23 of the lower magnetic pole front end layer 19, relatively high leakage magnetic fields Hxz are generated at the position for the air bearing surface of the upper end surface 23 of the lower magnetic pole front end layer. On the other hand, the thin film recording head of the first embodiment shown in FIG. 1 is such that the upper end surface 23 of the lower magnetic pole front end layer 19 is spaced apart from the air bearing surface 15, the off-track leakage magnetic fields Hxz on the air bearing surface are greatly decayed. The lowering of the off-track leakage magnetic fields allows great decrease of the phenomenon that the signals recorded in adjacent tracks are eliminated and decayed, making it possible to provide a magnetic recording drive of a narrow track pitch.

As described above, a thin film recording head greatly decreasing the off-track leakage magnetic fields Hxz can be provided by the constitution shown in FIG. 1. To manufacture the thin film recording head in FIG. 1, the protrusion 24 is formed by ion milling using the upper magnetic pole front end layer 8 as a mask, for which it is necessary to greatly increase the fabrication depth as compared with formation of the trimmed portion 22. Accordingly, a lower magnetic pole front end layer 19 provided with the protrusion 24 in advance is formed, on which the upper magnetic pole front end layer 8 is formed. The upper magnetic pole front end layer 8 is formed as follows: a resist is coated on a recording gap layer 6 on the lower magnetic field front end layer 19, a portion to be formed into the shape of the lower magnetic pole front end layer 19 is removed by exposure through the mask and development; and, further, a magnetic layer to serve as the upper magnetic pole front end layer 8 is formed at the removed portion by a plating method.

In the second embodiment of the invention shown in FIG. 2, the width Lpfw for the protrusion 24 is formed larger than the track width Tw. After forming the upper magnetic pole front end layer 8 above the protrusion 24, a trimmed portion 22 is formed by ion milling or the like using the track portion of the upper magnetic pole front end layer 8 as a mask so that the width for the trimmed portion 22 of the lower magnetic pole front end layer 19 is substantially equal to the track width Tw for the upper magnetic pole front end layer 8. Other constitutions are identical with those in the first embodiment.

Figure 7:
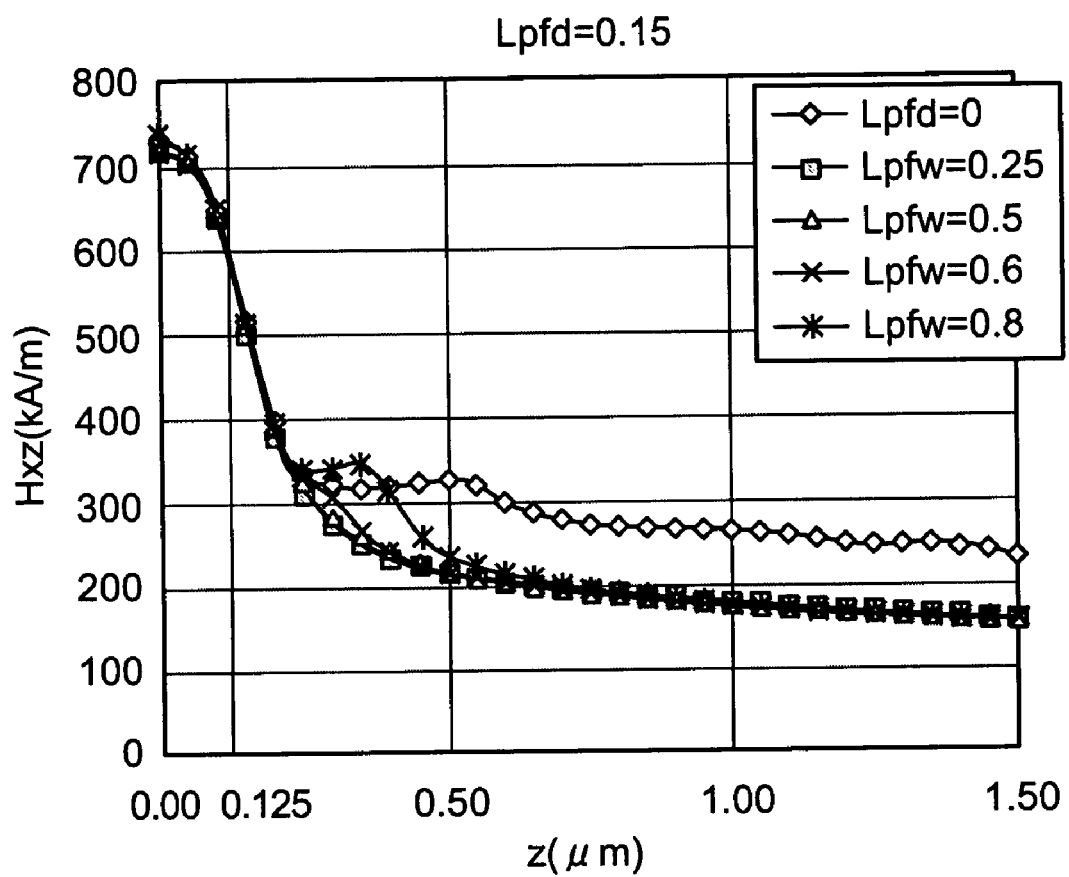
FIG. 7 is a view comparing off-track leakage magnetic fields between the thin film recording head according to the second embodiment of the present invention and the conventional thin film recording head.

FIG. 7 shows the change of the off-track leakage magnetic fields Hxz when the width Lpfw for the protrusion 24 of the lower magnetic pole front end layer 19 is changed. It is defined as: Lpfd≈0.15 µm. As shown in the drawing, even when Lpfw is made larger by 0.35 µm than the track width (=0.25 µm), that is, set to 0.6 µm which is 2.4 times as large as thereof, the decreasing effect for the off-track leakage magnetic fields Hxz can be maintained. In a case where it is increased to 0.8 µm which is larger by 0.55 µm, that is, 3.2 times as large as the track width (0.8 µm), off-track leakage magnetic fields Hxz increase partially as compared with a case of: Lpdf≈0, that is, with no provision of the protrusion 24.

According to the thin film recording head of the second embodiment of the invention, if the width for the protrusion 24 of the lower magnetic pole front end layer 19 is increased to 2.4 times as large as the track width Tw, it is possible to absorb alignment error between the track width Tw for the upper magnetic pole front end layer 8 and the protrusion 24 and decrease the off track leakage magnetic fields Hxz.

As described above, so long as the width Lpfw for the protrusion 24 is not more than 2.4 times the track width Tw, the effect of decreasing the off-track leakage magnetic fields Hxz can be obtained. Then, the effect is obtainable when the retraction amount Lpfd of the lower magnetic pole front end layer 19 other than the protrusion 24 from the air bearing surface 15 is a value exceeding zero, and a substantial effect is observed when it is 0.01 µm or more. Further, when Lpfd increases, while the effect of decreasing the off-track leakage magnetic fields Hxz increases, the recording magnetic fields at the track center tend to be lowered. In order to prevent this tendency it is preferably 1 µm or less and, desirably, 0.5 µm or less.

The thin film magnetic head may include such a constitution that the width for the lower magnetic pole main layer 18 or the lower magnetic pole front end layer 19 and the width for the upper magnetic pole main layer 13 or the upper magnetic pole front end layer 8 are made substantially equal from the air bearing surface 15 toward the direction of the depth thereof. However, the width for the lower magnetic pole main layer 18 or the lower magnetic pole front end layer 19 is basically constituted to be larger than the track width Tw and the width Lpfw for the protrusion 24 from the rear part of the head in the vicinity of the air bearing surface in the thin film recording head of the embodiment described above. This provides a feature in preventing lowering of the recording magnetic fields. Specifically, the width for the lower magnetic pole main layer 18 or the lower magnetic pole front end layer 19 is larger than the track width Tw and the width Lpfw for the protrusion 24 at the position spaced apart by Lpfd or more from the air bearing surface and equals the width for the protrusion 24 at the position spaced apart by Lpfd or less.

Third Embodiment

Figure 8:
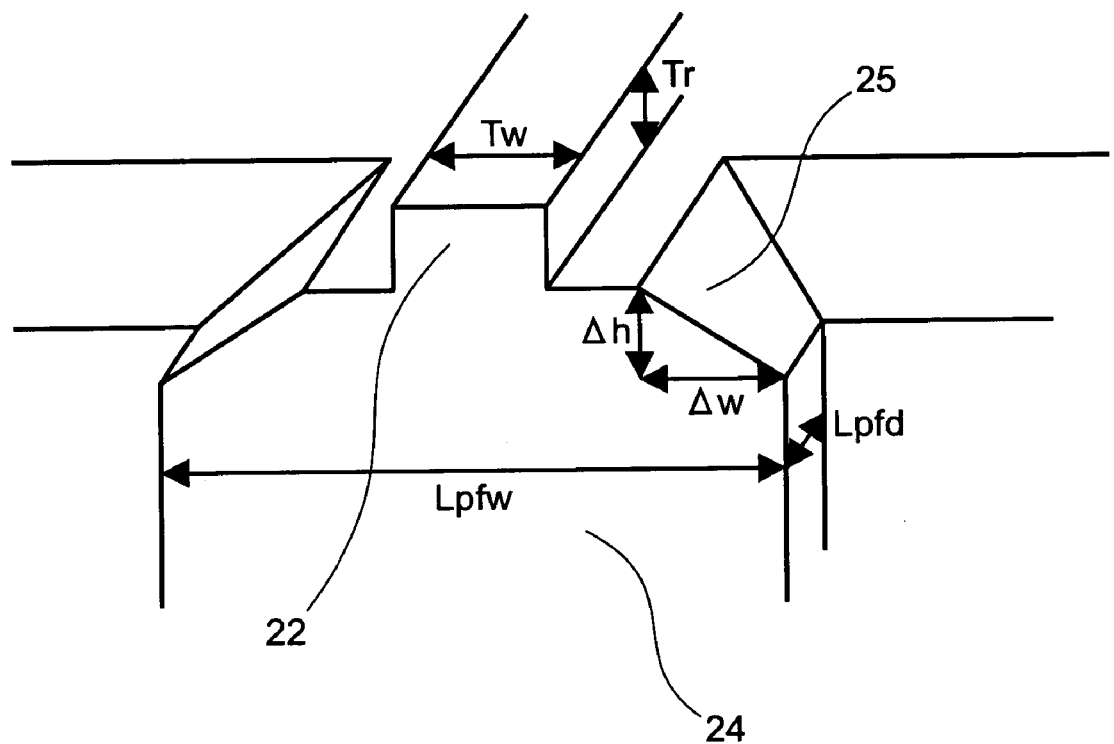
FIG. 8 is a perspective view of a thin film recording head front end of a recording/reproducing separated type magnetic head according to a third embodiment of the present invention.
Figure 9:
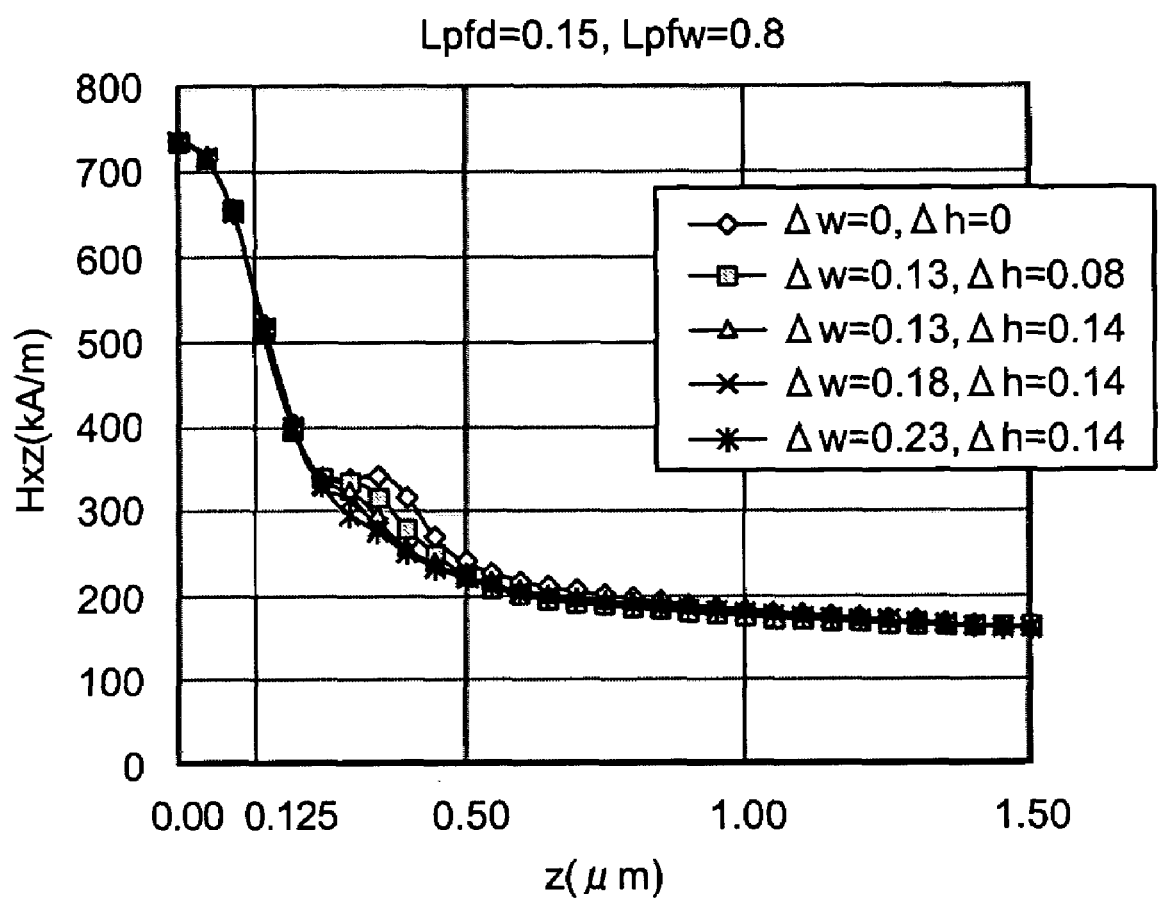
FIG. 9 is a graph showing off-track leakage magnetic fields of the thin film recording head of the recording/reproducing separated type magnetic head according to the third embodiment of the present invention.

FIG. 8 shows a thin film recording head of a recording/reproducing separated type magnetic head according to a third embodiment of the invention. In the third embodiment, a protrusion 24 is removed at upper end corners 25 for a width ΔW and a depth Δh in order to make the width for the protrusion 24 larger so as to readily absorb alignment error relative to the upper magnetic pole front end layer 8. Since other constitutions are identical with those in FIG. 2, they are not illustrated. FIG. 9 shows off-track leakage magnetic fields Hxz at: Lpfd=0.15 µm and Lpfw=0.8 µm. As shown by the graph, the off-track leakage magnetic fields Hxz can be decreased by making Δw and Δh larger as compared with the case of: Δw=0 and Δh=0. Accordingly, in the thin film recording head of the second embodiment shown in FIG. 2, even when the width Lpfw for the protrusion 24 is made at Lpfw≈0.8 µm which is larger by 0.55 µm than the track width Tw, the off-track leakage magnetic fields Hxz can be decreased by removing the upper end corners 25 of the protrusion 25. Accordingly, the width Lpfw for the protrusion 24 can be increased and the positional alignment can be made easily with respect to the track portion of the upper magnetic pole front end layer 8.

FIG. 10 and FIG. 11 shows the outline for the manufacturing method of a thin film recording head of this embodiment. The thin film recording head of this embodiment is manufactured as follows: a lower magnetic pole front end layer 19 and a lower magnetic pole rear end layer 20 are formed in FIG. 4; then the gap therebetween is filled with a lower non-magnetic insulating layer 21; the surface of the insulating layer 21 is planarized by polishing; and, further, a recording gap layer 6 is formed on thereon.

FIG. 10(*a*) shows the vicinity of the head front end in the state in which a recording gap layer 6 has been formed, as viewed from an air bearing surface 15. A protrusion 24 of the lower magnetic pole front end layer 19 is formed on a lower magnetic pole main layer 18, a lower non-magnetic insulating layer 21 is filled on both sides thereof and the recording gap layer 6 is formed thereon. Then, as shown in FIG. 10(*b*), a track portion 8 of the upper magnetic pole front end layer is formed over the protrusion 24.

Further, as shown in FIG. 11(*c*), the lower non-magnetic insulating layer 21 and the recording gap layer 6 made of oxides are selectively etched by reactive ion etching etching (RIE) to form a step d between the upper end face of the protrusion 24 and the upper end face of the lower non-magnetic layer 21. In this case, when Al series oxides such as $Al_2O_3$ are used for the lower non-magnetic insulating layer 21 and the recording gap layer 6, a chlorine series gas such as $BCl_3$ is used as an etching gas. Further, in a case of using Si series oxides such as $SiO_2$ for the non-magnetic insulating layer 21 and the recording gap layer 6, a fluorine series gas such as CF3 or CF4 is used. Therefore, since an etching rate ratio as high as 10 to 100 is attained between the magnetic metal layer used for the protrusion 24 and the lower non-magnetic insulating layer 21 and the recording gap 6, the step d for the lower non-magnetic insulating layer 21 can be formed easily.

Then, as shown in FIG. 11(d), the upper surface of the protrusion 24 is removed by ion milling or the like using the track portion 8 of the upper magnetic pole front end layer as a mask. Thus a trimmed portion 22 is formed. Further, since the step d with respect to the lower non-magnetic insulating layer 21 is present, upper end corners 25 in the protrusion 24 are removed by portions corresponding to the width □w and the depth □h.

In a case of conducting ion milling in FIG. 11(d) without forming the step d for the non-magnetic insulating layer 21 by using RIE in FIG. 11(c), since the etching rate for the Al series or Si series oxides used for the lower non-magnetic insulating layer 21 is slower as compared with the etching rate for the magnetic metal layer used for the protrusion 24, the upper end corners 25 of the protrusion 24 can not be removed.

On the other hand, in a case of using an organic material such as a photoresist for the non-magnetic insulating layer 21, since the etching rate by the ion milling is higher for the organic material such as the photoresist as compared with the magnetic metal film, the upper end corners 25 of the protrusion can be removed as desired by conducting ion milling in FIG. 11(d) without providing the step d with respect to the lower non-magnetic insulating layer 21. In a case of using the photoresist for the lower non-magnetic insulating layer 21, it is necessary to remove the photoresist after forming the upper magnetic pole front end layer 8 and fill a non-magnetic insulating layer such as $Al_2O_3$ again, thereby preventing exposure of the photoresist to the air bearing surface 15.

Fourth and Fifth Embodiment

Figure 3:
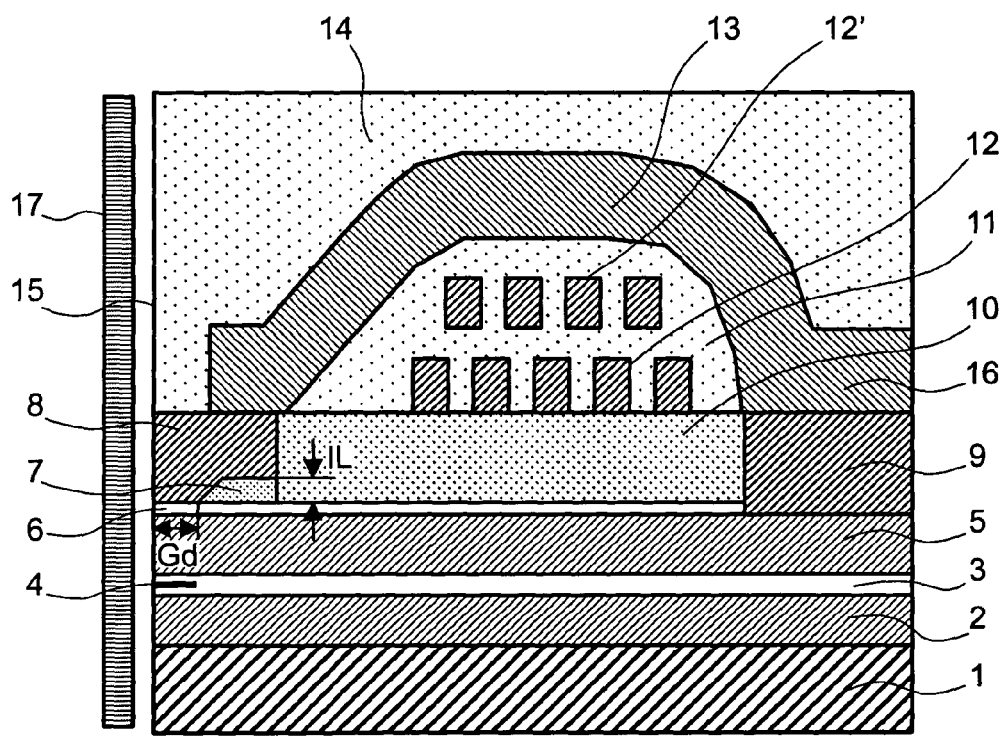
FIG. 3 is a cross sectional view of a conventional recording/reproducing separated type magnetic head.
Figure 4:
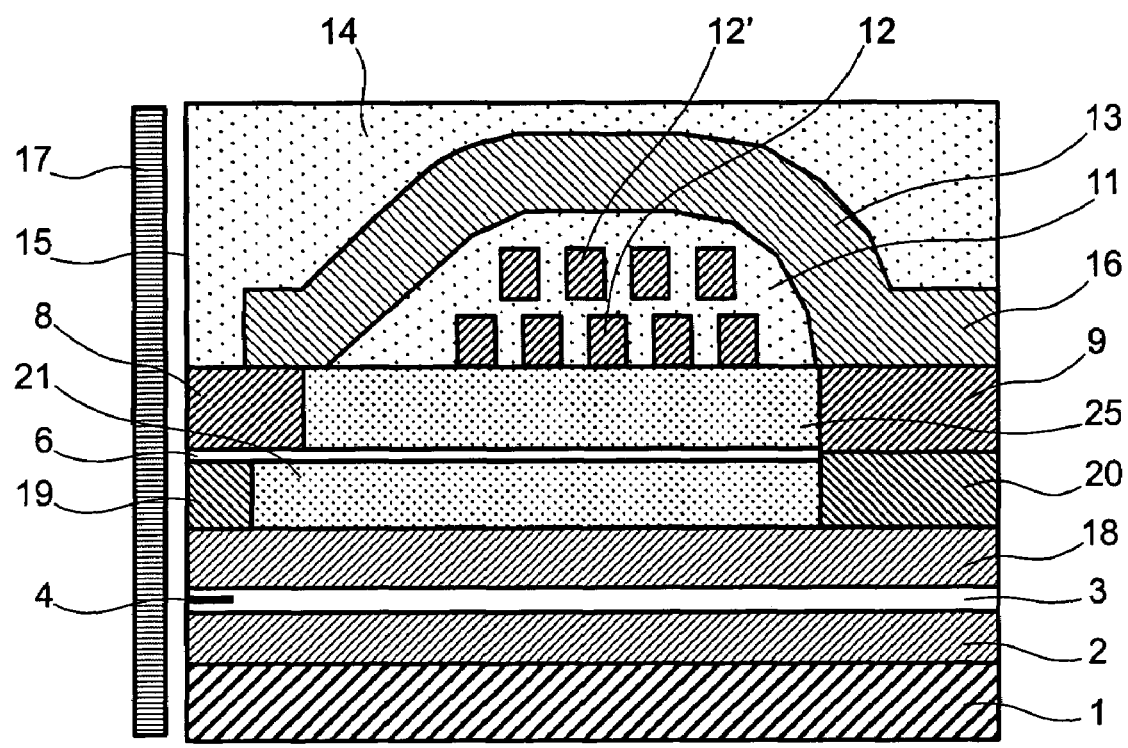
FIG. 4 is a cross sectional view of a conventional recording/reproducing separated type magnetic head.

Each of the embodiments described above according to the invention illustrates an example based on the thin film recording head in which the lower magnetic pole front end layer 19 shown in FIGS. 4 and 5 is present. However, also in a case of disposing a protrusion 24 on a lower magnetic pole 5 as shown in FIG. 12 and FIG. 13 based on the thin film recording head with no lower magnetic pole front end layer shown in FIG. 3, the effect of decreasing the off-track leakage magnetic fields can be obtained in the same manner as in each of the embodiments (fourth embodiment).

Figure 14:
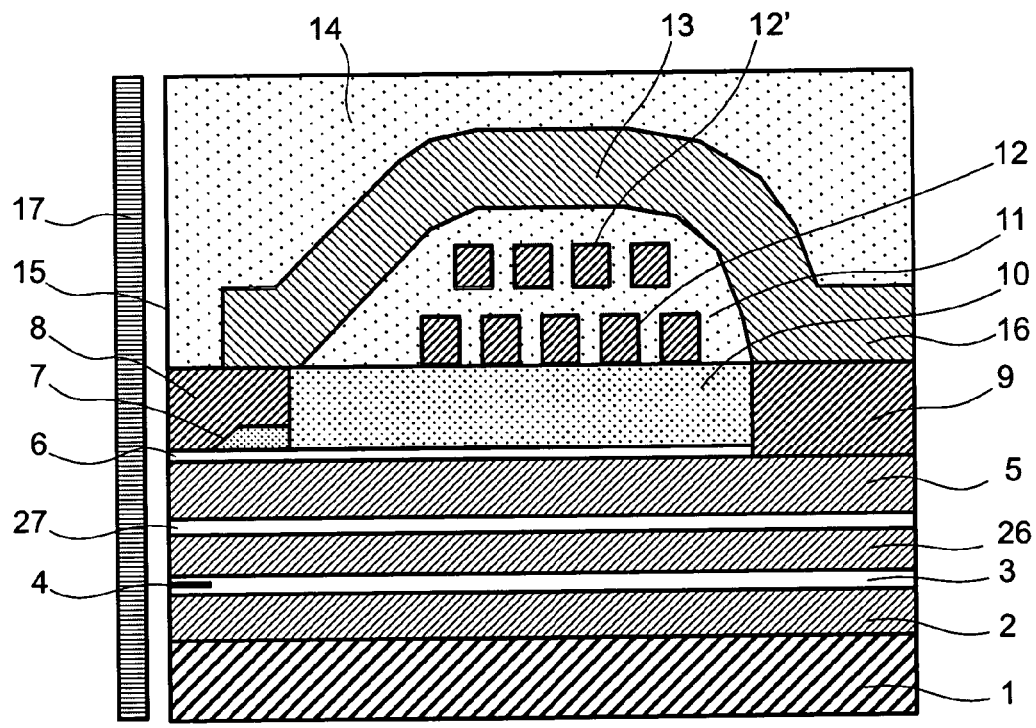
FIG. 14 is a cross sectional view of a recording/reproducing separated type magnetic head according a fifth embodiment of the present invention.
Figure 15:
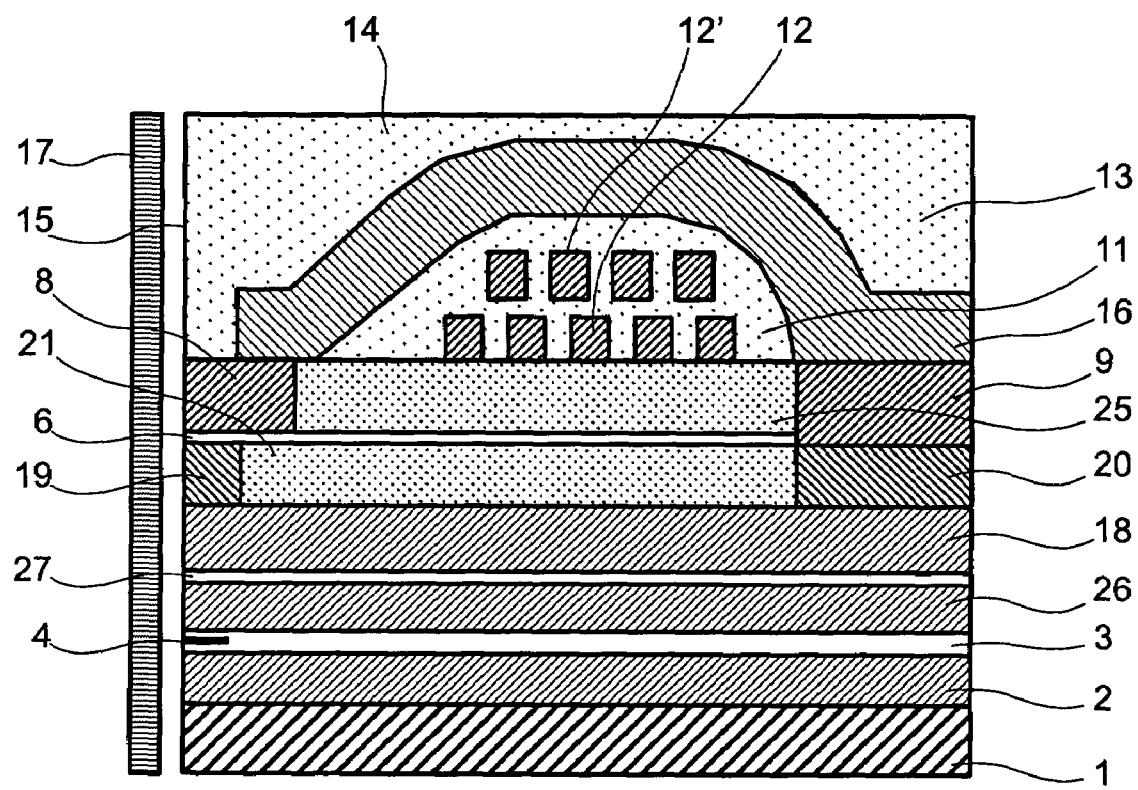
FIG. 15 is a cross sectional view of a recording/reproducing separated type magnetic head according a fifth embodiment of the present invention.

Further, FIG. 3 and FIG. 4 show a recording/reproducing separated type magnetic head in which the lower magnetic pole and the upper magnetic field are used in common. However, as shown in FIG. 14 and FIG. 15, there may be adopted a so-called piggy-back structure in which the upper magnetic shield 26 is separate from the lower magnetic pole 5 or the lower magnetic pole main layer 18 and a separation layer 27 made of a non-magnetic material is disposed between them. This can decrease leakage of recording magnetic fluxes from the lower magnetic poles 5, 18 to a reproducing element 4 to prevent instability of read output (fifth embodiment).

Figure 12:
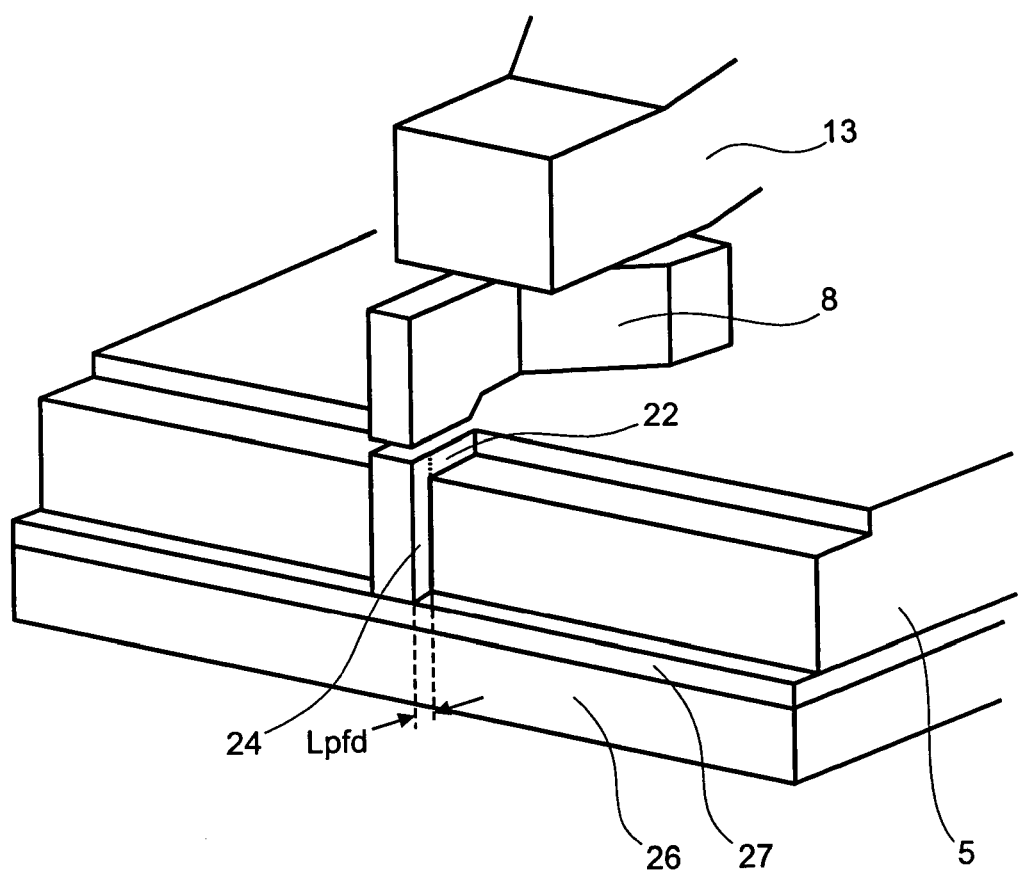
FIG. 12 is a perspective view of a thin film recording head of a recording/reproducing separated type magnetic head according to a fourth embodiment of the present invention, as viewed in the direction of an air bearing surface.
Figure 13:
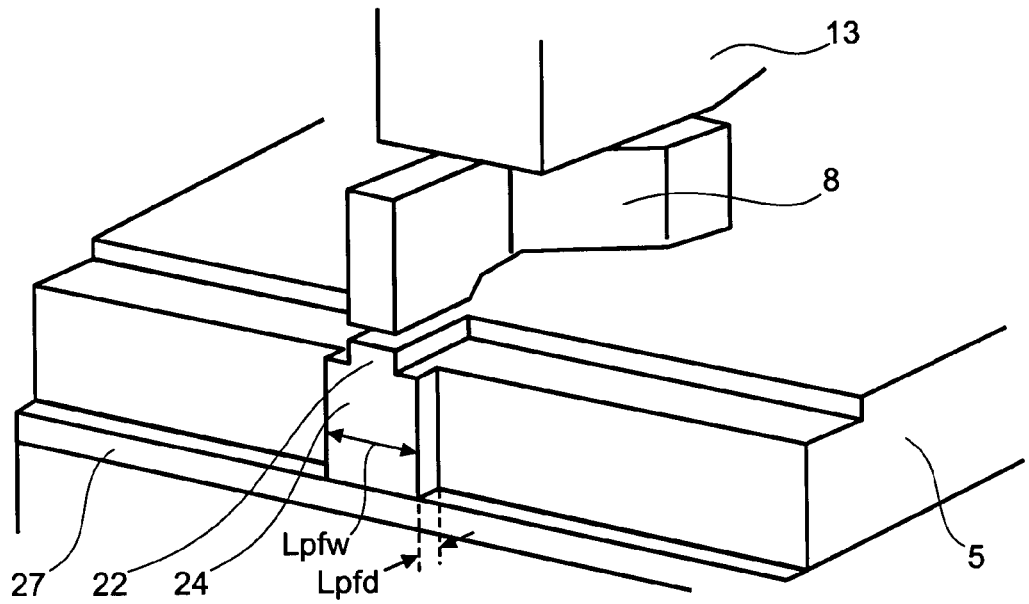
FIG. 13 is a perspective view of a thin film recording head of a recording/reproducing separated type magnetic head according to a fourth embodiment of the present invention, as viewed in the direction of an air bearing surface.

The recording/reproducing separated type magnetic heads shown in FIG. 12 and FIG. 13 show an example of a piggy-back type in which a separation layer 27 is provided.

The lower magnetic pole front end layer 19 or the lower magnetic pole 5 provided with the protrusion 24 in Embodiments 4 and 5 is preferably prepared by a so-called frame plating method or pattern plating method. In these methods, a conductive seed layer is formed on a substrate to which the lower magnetic pole front end layer 19 or the lower magnetic pole 5 is to be formed by a sputtering method or the like and then a photoresist is coated further thereon. Then, the photoresist is exposed through the mask and then developed to remove a portion to form the shape of the lower magnetic pole front end layer 19 or the lower magnetic pole 5 having the protrusion 24, and a magnetic layer to serve as a magnetic pole front end layer 19 or the lower magnetic pole 5 is formed to the portion by an electric plating method.

The frame plating method is a method of forming a frame-like resist having a certain width so as to surround the desired shape of the magnetic pole, while the pattern plating method is a method of forming a resist pattern in which the resist shape is not a frame like shape, the magnetic pole has a concave shape and the periphery is constituted with the resist. Any of the methods is suitable for a method of manufacturing the width Lpfw for the protrusion 24 and the retraction amount Lpfd of the lower magnetic pole front end layer 19 or the lower magnetic pole 5 with a good accuracy. Further, a lower magnetic pole front end layer 19 or a lower magnetic pole 5 with no protrusion 25 may be formed by a plating or sputtering method and an unnecessary portion may be removed through a mask by ion milling or the like to form a protrusion 24.

In the thin film recording heads of Embodiments 4 and 5, since the magnetic film constituting the protrusion 24 is a principal portion which is in contact with a recording gap together with the upper magnetic pole front end layer 8 to generate recording magnetic fields, it is necessary to use a magnetic material of high saturation magnetic flux density. Specifically, the material includes an FeCo layer or a magnetic layer containing a smaller amount of N, Ni and the like contained therein in order to increase corrosion resistance. They have a high saturation magnetic flux density up to 2.4 T at the maximum. Further, CoNiFe film can provide a high saturation magnetic flux density ranging from 1.8 T to 2.4 T by controlling the composition. Further, an FeNi layer containing 50 wt % or more of Fe can provide a high saturation magnetic flux density of 1.6 T or more.

The layers described above may form the lower magnetic pole top layer 19 or the lower magnetic pole 5 by a single layer but it is also possible to constitute the same with two or more layers in which a magnetic layer having a high saturation magnetic flux density such as an FeCo layer can be used for the upper layer of the lower magnetic pole front end layer 19 or the lower magnetic pole 5 in contact with the recording gap, while a layer having a saturation magnetic flux density lower than the FeCo film has but having higher corrosion resistance such as a CoNiFe or 46NiFe layer can be used for the lower layer of the lower magnetic pole front end layer 19 or the lower magnetic pole 5.

Sixth Embodiment

Figure 16:
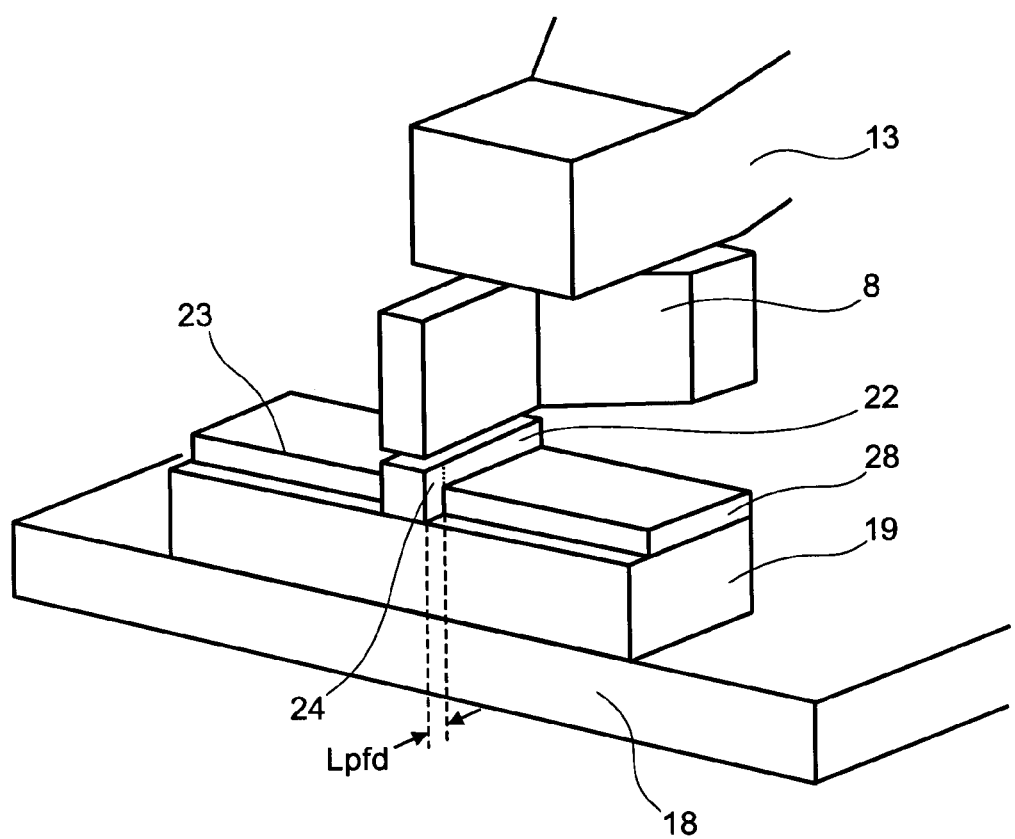
FIG. 16 is a perspective view of a thin film recording head of a recording/reproducing separated type magnetic head according to a sixth embodiment of the present invention, as viewed in the direction of an air bearing surface.
Figure 17:
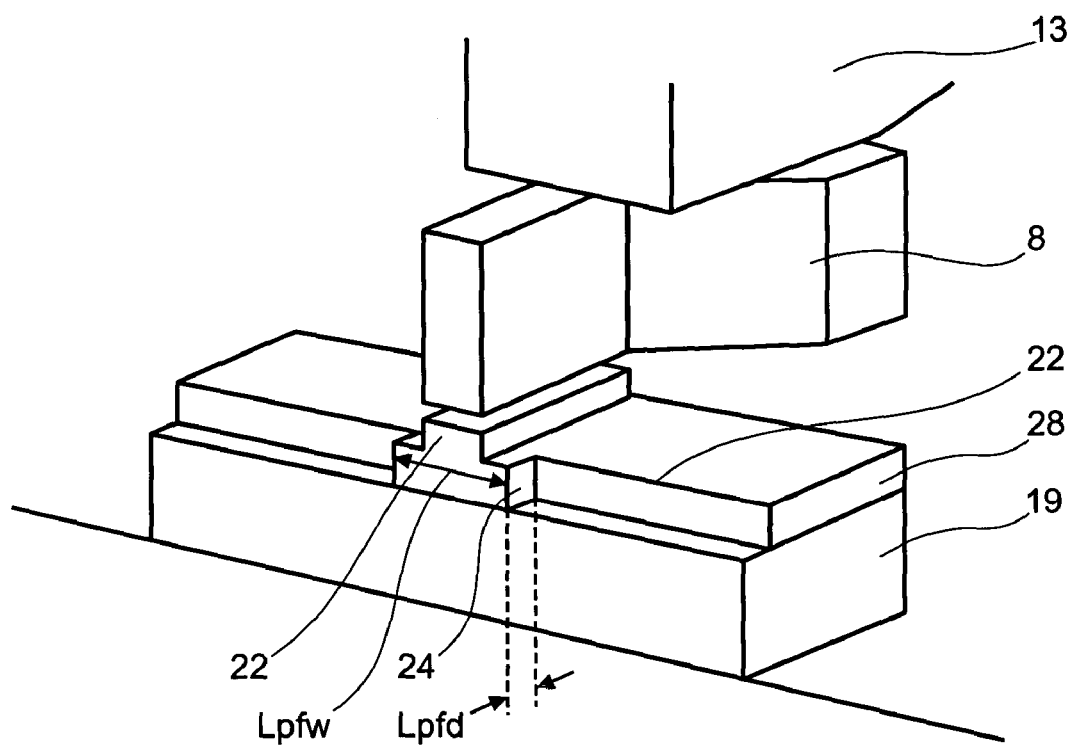
FIG. 17 is a perspective view of a thin film recording head of a recording/reproducing separated type magnetic head according to the sixth embodiment of the present invention, as viewed in the direction of an air bearing surface.

FIG. 16 and FIG. 17 show a sixth embodiment of the invention. An example of using a lower magnetic pole front end layer 19 is shown, but the situation is identical in a case only consisting of the lower magnetic pole 5 with no lower magnetic pole front end layer 19. In this embodiment, the lower magnetic pole front end layer 19 comprises a plurality of layers and a protrusion 24 is formed only on the upper layer 28 of the lower magnetic pole front end layer as shown in the drawing. Also in this case, since a portion of the upper end surface 23 of the lower magnetic pole front end layer 19 exposed to the air bearing surface 15 is spaced apart from the recording gap, off-track leakage magnetic fields can be decreased.

FIG. 18 and FIG. 19 show an example for the method of manufacturing a thin film recording head of this embodiment. FIG. 18 is a view in which the vicinity for the lower magnetic pole front end layer is viewed from the air bearing surface. As shown in FIG. 18(a), a lower layer 29 of the lower magnetic pole front end layer is formed on a lower magnetic pole main layer 18 by the frame plating method or pattern plating method, a lower non-magnetic insulating layer is filled and planarized, and a magnetic layer to serve as an upper layer 28 of the lower magnetic pole front end layer is formed thereon. The upper layer 28 of the lower magnetic pole front end layer may be formed by using the same frame plating method or pattern plating method as described above but planarization by polishing is required again.

While a relatively high accuracy is required for the thickness of the upper layer 28 for the lower magnetic pole front end layer in order to suppress variations in the recording characteristics, polishing is not always satisfactory in view of the accuracy for the film thickness. Accordingly, a so-called lift-off method is used in this embodiment. As shown in FIG. 18(b), a resist pattern 30 having a width for the upper portion larger than the width for the lower portion is formed on the magnetic layer of the upper layer 28 of the lower magnetic pole front end layer, for example, by a two-stage resist method or the like. The resist pattern 30 has substantially the same shape as that of the upper layer 28 of the lower magnetic pole front end layer having the protrusion 24.

Then, as shown in FIG. 19(c), an unnecessary portion of the magnetic layer 28 of the upper layer of the lower magnetic pole top layer is removed by ion milling or the like using the resist pattern 30 as a mask to obtain a shape of the upper layer 28 of the lower magnetic front end layer having the protrusion 24. Then, as shown in FIG. 19(d), a non-magnetic insulative film 21 is filled in a portion previously removed with the magnetic layer by a sputtering method or the like using the resist pattern 30 as a mask to provide the upper layer 28 of the lower magnetic pole front end layer and the non-magnetic insulating layer 21 of substantially planar shape. Further, the thin film recording head of the embodiment can be obtained by removing the mask pattern 30, forming the recording gap layer 6 and applying the same subsequent methods as those shown in FIG. 10 and FIG. 11.

In this embodiment, a plated layer may be used for the magnetic layer used in the upper layer 28 of the lower magnetic pole front end layer but a sputtered layer may also be used. In a case of using sputtered layer, FeCoAlO series magnetic layers or FeCoN series magnetic layers which can not be used for the plating layer can be used and corrosion resistance can be improved.

Figure 20:
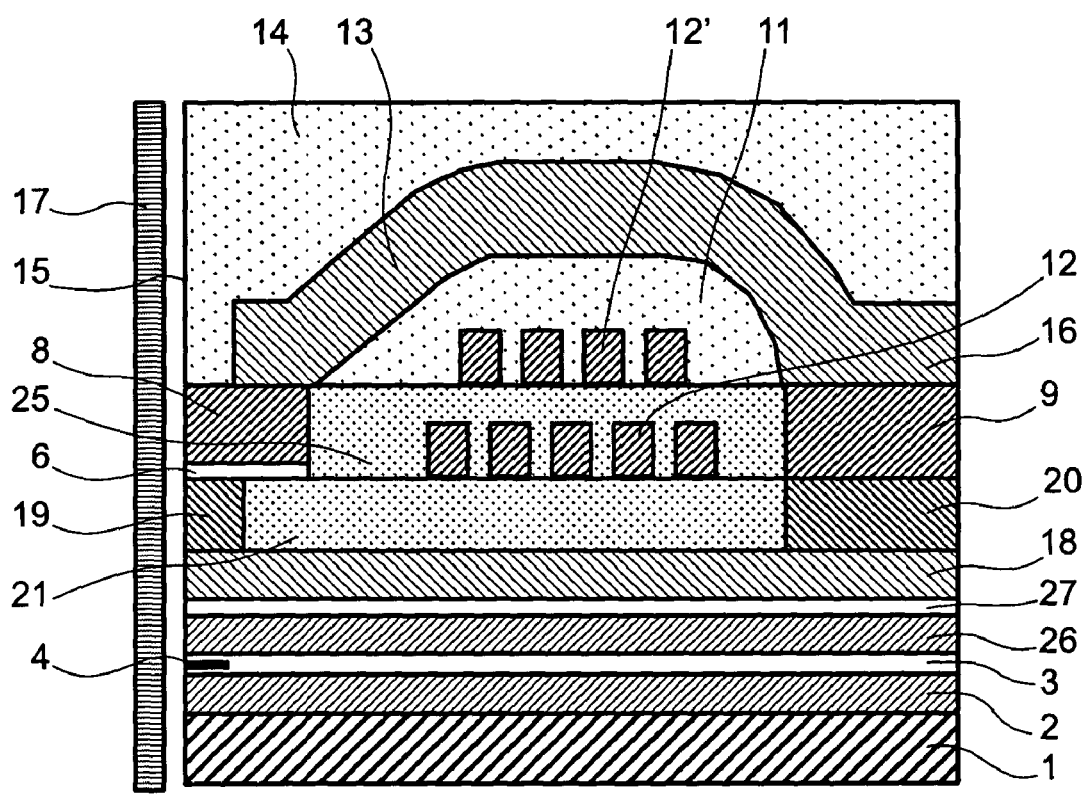
FIG. 20 is a cross sectional view showing an example for the arrangement of r coils applied to each of the embodiments according to the present invention.

Each of the embodiments of the invention described above shows an example in which conductor coils comprise two layers and surround the upper layer rear end 16 of the upper magnetic pole but the conductor coils may comprise one layer or three layers. Further, as shown in FIG. 20, a constitution may be used in which lower layer conductor coils 12 are present between the upper magnetic pole front end layer 8 and the upper magnetic pole rear end layer 9 and surround the upper magnetic pole rear end layer 9 while the upper layer conductor coils 12' surround the upper layer rear end 16 of the upper magnetic pole, or a constitution may be used in which the lower layer conductor coils 12 are present between the lower magnetic pole front end layer 19 and the lower magnetic pole rear end layer 20 and surround the lower magnetic pole rear end layer 20 (not illustrated).

Figure 21:
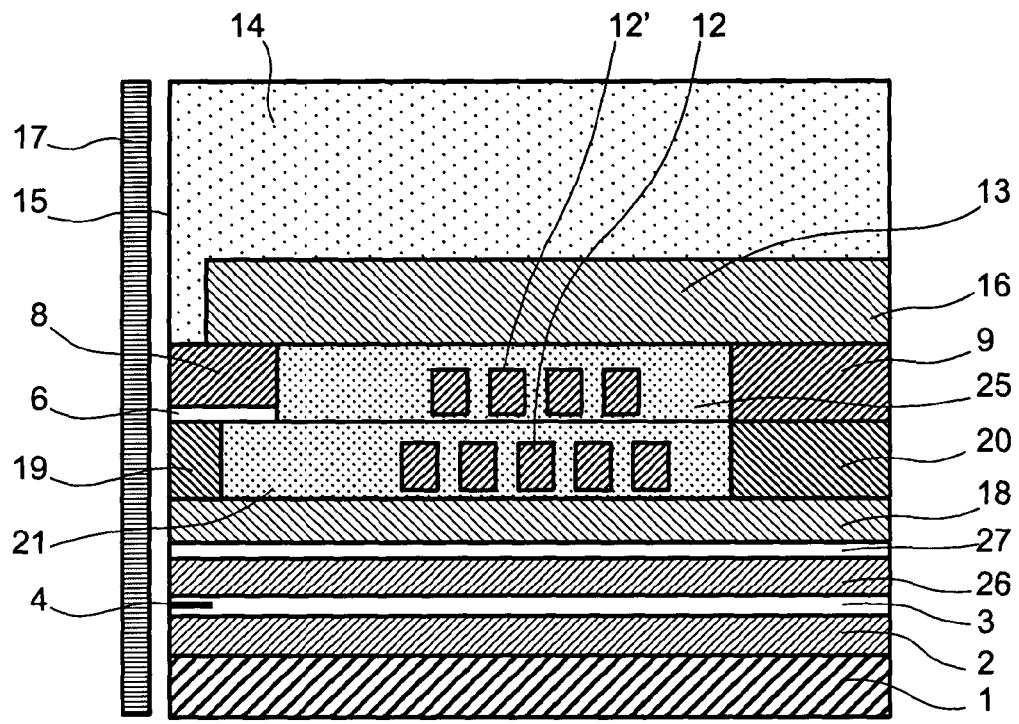
FIG. 21 is a cross sectional view showing an example for the arrangement of r coils applied to each of the embodiments according to the present invention.

Further, as shown in FIG. 21, a constitution may be used in which lower layer conductor coils 12 are present between the lower magnetic pole front end layer 19 and the lower magnetic pole rear end layer 20, while upper layer conductor coils 12' are present between the upper magnetic pole front end layer 8 and the upper magnetic pole rear end layer 9 and, further, a constitution comprising only the lower layer conductor coils 12 in FIG. 21 may be used. Since the conductor coils are not present in the portion for the upper magnetic pole upper layer 13 in FIG. 21, the upper magnetic pole upper layer 13 has a planar shape. This is advantageous for the improvement in the high frequency characteristics since the substantial circumferential length of a magnetic circuit is short.

Figure 22:
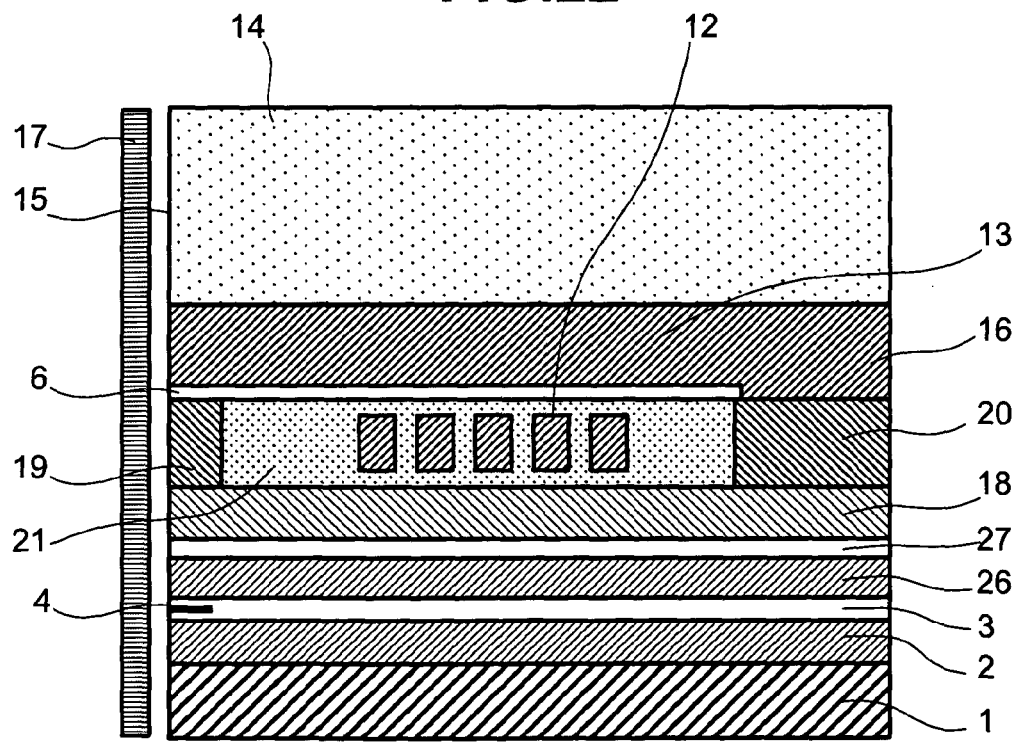
FIG. 22 is a cross sectional view showing an example for the arrangement of r coils applied to each of the embodiments according to the present invention.

Further, in the example of FIG. 22, the lower magnetic pole comprises the lower magnetic pole front end layer 19, the lower magnetic main layer 18, and the lower magnetic pole rear end layer 20, while the upper magnetic pole has no front end layer but includes only the planer upper magnetic pole upper layer 13 and the head end forms the track width. The conductor coils 12 are disposed between the lower magnetic pole top layer 19 and the lower magnetic pole rear end 20. In the constitution described above, since the circumferential length of the magnetic circuit can be shortened, this is advantageous for the improvement in frequency characteristics. Also in this constitution, the off-track leakage magnetic fields can be decreased and decays of signals in adjacent tracks can be prevented by providing the protrusion on the lower magnetic pole front end layer 19 and retracting the lower magnetic pole front end layer 19 other than the protrusion from the air bearing surface like in each of the embodiments.

In each of the embodiments according to the invention described above, the effect of reducing the off-track leakage magnetic fields without lowering the recording magnetic fields in the thin film recording head can be obtained at any track width, and it can provide excellent effect, particularly, in a region of a narrow track width with the track width of 0.3 µm or less, and a track pitch at 70 kTPI or more, which will create a significant problem in terms of the recording magnetic field intensity and off-track leakage magnetic fields. Further, it can provide an excellent effect when incorporated into a magnetic disk drive using a high coercivity medium having a recording medium coercivity of 279 kA/m (3500 Oe) or more.

A magnetic disk drive which mounts any of the recording/reproducing separated type magnetic heads of the embodiments described above comprises a magnetic recording medium and a motor for driving the same, a mechanism for positioning the recording/reproducing separated type magnetic head, circuitry for controlling the above elements, and circuitry for supplying recording signals to the recording/reproducing separated type magnetic head and processing read signals from the recording/reproducing separated type magnetic head, and provides a magnetic recording medium coercivity of 279 kA/m (3500 Oe) or more and a track pitch of 70 kTPI or more.

Further, the present invention also provides an excellent effect in magnetic disk array apparatus incorporated with a magnetic disk drive using the recording/reproducing separated type magnetic head of the invention.

Features for the method of manufacturing the thin film recording head in the recording/reproducing separated type magnetic head according to the invention as has been described above is summarized as below.

The lower magnetic pole 5 or the lower magnetic pole front end layer 19 including the protrusion 24 is formed by a frame plating method or a pattern plating method.

The portion of the lower magnetic pole 5 or the lower magnetic pole front end layer 19 retracted from the air bearing surface 15 is filled with Al-containing oxides, and the filled oxide layer 21 is etched selectively by a reactive ion etching method using a boron series gas, to provide a step d between the upper end surface of the protrusion 24 and the upper end surface of the oxide layer 21.

Further, a portion of the lower magnetic pole 5 or a portion of the lower magnetic pole front end layer 19 retracted from the air bearing surface 15 is filled with an Si-containing oxide, and the filled oxide layer 21 is etched selectively by a reactive ion etching method using a fluorine series gas, to provide a step d between the upper end surface of the protrusion 24 and the upper end surface of the oxide layer 21.

An unnecessary portion of the magnetic layer of the upper layer of the lower magnetic pole 5 or the lower magnetic pole front end layer 19 is removed by using a resist pattern 30 as a mask and a non-magnetic insulating layer 21 is formed on a removed portion using the identical resist pattern 30 as a mask such that the upper surface of the upper layer of the lower magnetic pole 5 or the lower magnetic pole front end layer 19 and the upper surface of the non-magnetic insulating layer 21 are substantially planarized.

As has been described above according to the present invention, the off-track leakage magnetic fields can be decreased greatly to provide a recording/reproducing separated type magnetic head capable of attaining a narrow track pitch, by providing a protrusion on the lower magnetic pole front end layer or the lower magnetic pole of the thin film recording head in the direction of the air bearing surface.

What is claimed is:

1. A recording/reproducing separated type magnetic head comprising:
   a reproducing head having a reproducing element, said reproducing element being disposed by way of an insulating layer formed between a lower magnetic shield disposed on a substrate and an upper magnetic shield; and
   a recording head including a lower magnetic pole disposed adjacent to said reproducing head and formed with a protrusion at one end of the lower magnetic pole, an upper magnetic pole disposed by way of a magnetic gap layer over the lower magnetic pole, said upper magnetic pole providing a magnetic gap at one end portion including the protrusion, said upper magnetic pole being connected with the lower magnetic pole on the side opposite to the magnetic gap, and conductor coils disposed by way of another insulating layer formed between the upper magnetic pole and the lower magnetic pole.

2. A recording/reproducing separated type magnetic head according to claim 1, wherein a second protrusion is formed on one end portion including the protrusion formed on the lower magnetic pole or the lower magnetic pole front end layer but at a portion opposing to the upper magnetic pole.

3. A recording/reproducing separated type magnetic head according to claim 1, wherein said upper magnetic pole has an upper magnetic pole front end layer located at a portion providing the magnetic gap, an upper magnetic pole upper layer in contiguous with the upper magnetic layer front end layer, and an upper magnetic pole rear end layer in contiguous with the upper magnetic pole upper layer and connected to the lower magnetic pole rear end layer.

4. A recording/reproducing separated type magnetic head according to claim 1, wherein the conductor coils are stacked by two or more layers and each of the conductor coils are connected in series at the end.

5. A recording/reproducing separated type magnetic head according to claim 1, wherein the conductor coils are constituted with two layers and the lower layer conductor coils are disposed between the upper magnetic pole front end layer and the upper magnetic pole rear end layer.

6. A recording/reproducing separated type magnetic head according to claim 1, wherein the conductor coils are constituted with two layers, the lower layer conductor coils are disposed between the lower magnetic pole front end layer and the lower magnetic pole rear end layer, and the upper layer conductor coils are disposed between the upper magnetic pole front end layer and the upper magnetic layer rear end layer.

* * * * *